(12) United States Patent
Kim et al.

(10) Patent No.: US 6,750,291 B2
(45) Date of Patent: Jun. 15, 2004

(54) FILM-FORMING AGENT FOR DRUG DELIVERY AND PREPARATION FOR PERCUTANEOUS ADMINISTRATION CONTAINING THE SAME

(75) Inventors: Young So Kim, Seoul (KR); Yang Gyu Choi, Seoul (KR); Jung Ju Kim, Seoul (KR)

(73) Assignee: Pacific Corporation, Seoul (KR)

( * ) Notice: Subject to any disclaimer, the term of this patent is extended or adjusted under 35 U.S.C. 154(b) by 264 days.

(21) Appl. No.: 10/121,288

(22) Filed: Apr. 12, 2002

(65) Prior Publication Data

US 2003/0199644 A1 Oct. 23, 2003

(51) Int. Cl.$^7$ ............................................... C08G 18/48
(52) U.S. Cl. ...................... 525/128; 524/391; 524/507; 424/449
(58) Field of Search ......................... 525/128; 524/391, 524/507; 424/449

(56) References Cited

U.S. PATENT DOCUMENTS

| | | | |
|---|---|---|---|
| 4,393,076 A | 7/1983 | Noda et al. | 424/317 |
| 4,542,012 A | 9/1985 | Dell | 424/28 |
| 4,560,555 A | 12/1985 | Snider | 424/78 |
| 5,041,100 A | 8/1991 | Rowland et al. | 604/265 |
| 5,156,601 A | 10/1992 | Lorenz et al. | 604/307 |
| 5,258,421 A | 11/1993 | Lorenz et al. | 523/111 |

FOREIGN PATENT DOCUMENTS

| | | | | |
|---|---|---|---|---|
| DE | 19828273 | * 12/1999 | | |
| WO | WO 90/00066 | 1/1990 | | A61L/25/00 |

* cited by examiner

*Primary Examiner*—Rachel Gorr
(74) *Attorney, Agent, or Firm*—Heslin Rothenberg Farley & Mesiti P.C.

(57) ABSTRACT

The present invention relates to a film-forming agent which forms a film on the skin, and also to a preparation for percutaneous administration containing the film-forming agent and active ingredient. The transdermal preparation including the film-forming agent of the present invention and active ingredient exhibits excellent elasticity and flexibility, shows superior adhesion power when formed on the skin, and forms non-sticky film.

19 Claims, 2 Drawing Sheets

FILM-FORMING AGENT FOR DRUG DELIVERY AND PREPARATION FOR PERCUTANEOUS ADMINISTRATION CONTAINING THE SAME

FIELD OF THE INVENTION

The present invention relates to a film-forming agent which forms film on the skin, and also to a transdermal preparation containing the film-forming agent and active ingredient.

BACKGROUND OF THE INVENTION

Recently, various transdermal preparations have been developed for the purpose of delivering active ingredient such as drug through the skin, or supplying active ingredient to the skin itself.

Such formulation can be divided into 'formulation of being applied' and 'formulation of being spread', and the former includes adhesive preparation such as plaster and cataplasm, and the latter includes spreadable semi-solid preparation such as cream, ointment and gel.

The externally applying preparation has advantage of capability of delivering active ingredient at the attached site for a desired amount of time while exhibiting defects of appearance problem upon applying to exposed part, inconvenience, difficulty to apply to curved region of body, skin irritation by repeated use to same site. Additionally, necessity of using extra supporting material (cotton, film, release paper etc.) raises cost.

On the other hand, the said spreadable semi-solid preparation can be applied regardless of shape or area of the application region, and freely applied even to exposed region. In addition, even when used repeatedly on the same site, skin irritation is lower than the adhesive preparation. However, the preparation such as ointment or cream is sticky and soils clothes or socks, and should be applied several times a day due to being easily smeared out.

Therefore, there has been demand for a film-forming agent that can overcome the defects of the said two formulations.

In general, as polymer which can form film upon application to the skin, poly(vinyl alcohol), cellulose, carboxyvinyl polymer, poly(vinyl pyrrolidone) etc. can be used.

As an example of drug delivery system using such film-forming polymer, U.S. Pat. No. 4,393,076 discloses gel preparation formulation for antiphlogistic analgesia using cellulose, carboxyvinyl polymer as film-forming agent, and Korean Patent Publication 96-8225 reports percutaneous formulation such as antiphlogistic analgesic, nicotine using as fast film-forming agent such as poly(vinyl alcohol), poly(vinyl pyrrolidone), cellulose or pectin etc., Korean Patent Laid-open Number 98-076273 reports transdermal film-forming gel formulation using poly(ethylene oxide), methoxyethylene maleic anhydride copolymer, cellulose derivatives, vinyl acetate-vinyl pyrrolidone copolymer and poly(vinyl alcohol), Korean Patent Laid-open Number 98-072361 discloses soft hydrogel external preparation comprising poly(vinyl pyrrolidone-α-acrylic acid) and poly(vinyl alcohol), and Korean Patent Publication No. 97-5282 discloses gel preparation using poloxamer containing propionic acid-series non-steroidal antiphlogistic analgesic drug.

However, the film-forming polymers used in the said references are defective in that they interfere with body movement due to lack of elasticity, high glass transition temperature brings collapse of the film formed after drying, leading to easy exfoliation from the skin.

Therefore, the present invention intended to develop a film-forming agent to which polyurethane is introduced, which is flexible due to low glass transition temperature, and allows free body movement for high elasticity.

On the other hand, as previous studies on such polyurethane, inventions for implant material such as catheter, heart valve based on high biocompatibility of polyurethane can be referred to. For example, U.S. Pat. No. 5,041,100 disclosed a study on reduction of friction occurring at the time of catheter insertion by modifying the surface of catheter with polyurethane, and U.S. Pat. No. 5,017,664 discloses a study for raising blood compatibility of medical instrument by developing biocompatible polyurethane.

Also, studies to develop polyurethane as substrate for external preparation were carried out. For example, Published International Patent Application WO 99/14283 suggested to deliver active ingredient with pressure-sensitive adhesive containing polyurethane, acrylic acid alkyl ester and vinyl acetate-type polymer, fatty acid or polyols, and Publishes International Patent Application WO 90/00066 presents polyurethane drug delivery system requiring second substrate, e.g. a method of spreading polyurethane containing external antibacterial agent on the skin by being dissolved in solvent, then by being covered with polyurethane film.

Additionally, as an invention for forming drug-delivering film on the skin by being spread in a state of solvent without the second substrate, U.S. Pat. No. 4,560,555 intended to develop polyurethane film substrate reacting directly to damaged skin as external protector for drug delivery, but this exhibited defect, safety problem for chemical reaction with the skin, difficulty to freely detach the attached film at any desired time point due to chemical binding.

On the other hand, in case of polyurethane film-forming agent, which is spread in a state of solvent while exhibiting no reaction with the skin, it is defective for being easily detached from the skin due to insufficient adhesion of polyurethane.

Therefore, to make up for such disadvantage, studies for introducing into polyurethane a second polymer having functional group capable of making secondary bonding with skin were conducted. For example, U.S. Pat. No. 4,542,012 relates to study on film-forming formulation containing antibacterial agent and introduced poly(vinyl pyrrolidone) in the synthesis of polyurethane. However, to introduce poly(vinyl pyrrolidone) during the polyurethane synthesis, an additional synthetic process for introducing isocyanate functional moiety into poly(vinyl pyrrolidone) is necessary. Yet, such a synthetic process is complicated and has difficulty in molecular structure control. Further, polyurethane synthesized by such process does not easily form microphase separation structure, so desired elasticity and flexibility is difficult to obtain, and polyurethane with desired molecular weight is difficult to obtain for steric hindrance due to side chain functional group. Also, it has no advantage in adhesion property, thus is difficult to apply to body of repeated movement.

As another method for supplementing the insufficient adhesion of polyurethane, there is a method of physical blending with the second polymer with functional group capable of making secondary chemical bonding with the skin. Yet, in this method, it is important to avoid phase separation by compatibility between polyurethane and the second polymer. Korean Patent Application No. 2000-18566 synthesized polyether as the second polymer with functional moiety to make secondary chemical bonding with the skin, phase separation was prevented by being synthesized to have identical main chain with polyurethane.

However, in this case, when main chain of polyurethane is changed, inconvenience occurs, that is, main chain of polyether should be also modified.

On the other hand, although U.S. Pat. Nos. 5,156,601 and 5,258,421 performed studies on a preparation for forming stable film on the skin through proceeding studies on sticky dressing gel comprising polyurethane and poly(N-vinyl lactam) dispersed in aqueous solution, this preparation also failed to exhibit advantage in flexibility and elasticity.

SUMMARY OF THE INVENTION

Therefore, the inventors of the present invention intended to develop a film-forming agent with superior elasticity, flexibility and adhesion power and transdermal preparation containing the same, through solving the problems of the previous inventions.

As the result, as the film-forming agent that can completely satisfy the said physical and chemical feature, the present invention developed 'blend' of (A) thermoplastic polyurethane and (B) addition polymerization polymer having a functional group of carboxylic acid derivative at main chain or side chain.

BRIEF DESCRIPTION OF DRAWINGS

These and other aspects of the present invention will become apparent upon reading the following detailed description when taken in combination with the accompanying drawings, wherein.

DETAILED DESCRIPTION OF THE INVENTION

Figure 1:
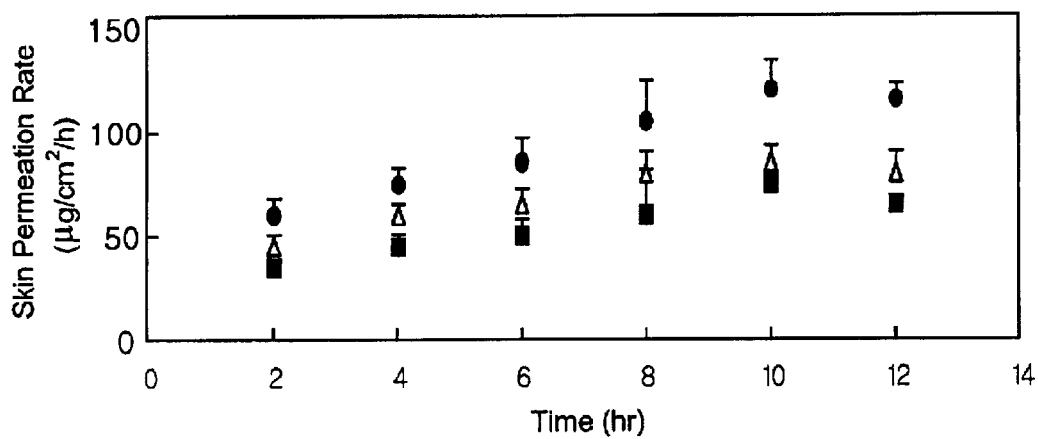
FIG. 1 presents skin permeation rate of ketopropene of Example 21 (●), Comparative Example 6 (■), and Comparative Example 7 (△) through the skin of guinea pig.

The present invention provides a film-forming agent to accomplish the said object, and also provides transdermal preparation containing the film-forming agent and active ingredient. More specifically, it provides a film-forming agent characterized in comprising (A) 50~99% by weight of polyurethane and (B) addition polymerization polymer 1~50% by weight including carboxylic acid derivative on main chain or side chain, i.e., carboxylic acid alkyl ester and/or carboxylic acid alkyl amide and/or carboxylic acid alkylaminoalkyl ester group.

In order for film formed on the skin to have flexibility, elastomeric property and adhesion property on the skin, the film-forming agent should have the following structural characteristics. That is, for flexibility at room temperature, glass transition temperature (Tg) of the material must be below room temperature, and this can be expressed with Modulus value of the film-forming agent, and the lower the modulus is, the higher the flexibility is.

In addition, cross-linking bond should exist within the structure for flexibility. There are chemical cross-linking and physical cross-linking, but in order for free dissolution of film-forming agent in solvent, physical cross-linking is preferred.

Additionally, for adhesion durability of the film formed on the skin, secondary chemical bonding with the skin is necessary, and for this, functional group capable of participating in secondary chemical bonding (hydrogen bonding or Van der Waals force) is necessary.

The thermoplastic polyurethane used in the present invention has in its structure both hard segment and soft segment, and the hard segment formed within soft segment leads to microphase separation structure for physical cross-linking, resulting in elasticity.

In particular, thermoplastic polyurethane of the present invention is obtained from reaction of (a-1) polyethylene glycol; (a-2) polydiol with hydroxyl group at both ends which has stronger hydrophobicity than polyethylene glycol; and (a-3) diisocyanate having isocyanate moiety on both ends, and elasticity and flexibility (glass transition temperature) of the film-forming agent in the present invention can be regulated by the kinds and ratio of polydiol and diisocyanate.

However, although such prepared polyurethane has superior elasticity and flexibility, in terms of adhesion power, it is unsatisfactory. Therefore, to provide sufficient adhesion power, more functional groups capable of forming secondary chemical bonding should be introduced to the main chain of polyurethane, but method of introducing functional group to polyurethane by chemical synthesis method is as described above complicated and difficult to control molecular structure. On the other hand, though it is possible to consider a method of physical mixing of polymer having functional group capable of forming secondary bonding, i.e., blending, in this case, phase separation might occur when chemical properties of the two polymers are completely different, and even though they have similar chemical properties, in many cases, the original microphase separation structure of polyurethane breaks down, leading to loss of unique elasticity and flexibility of polyurethane.

Therefore, the present invention performed blending of polyurethane with, as polymer having functional group capable of forming secondary bonding, addition polymerization polymer essentially containing at a main or a side chain carboxylic acid derivative, that is, carboxylic acid alkyl ester and/or carboxylic acid alkyl amide and/or carboxylic acid alkyl aminoalkyl ester group.

The film-forming agent thus obtained according to the present invention exhibits superior elasticity, flexibility and adhesion property while showing no phase separation.

TERMS AND DEFINITIONS

The following terms have the indicated meaning throughout this disclosure:

"Film-forming agent" defines the polymer itself, which exhibits superior adhesion power and elasticity while showing no stickiness, that is, polymer comprising (A) polyurethane and (B) addition polymerization polymer which essentially includes at a main or a side chain, carboxylic acid derivative, that is, carboxylic acid alkyl ester and/or carboxylic acid alkyl amide and/or carboxylic acid alkyl aminoalkyl ester group.

"Film-forming agent formulation" is a formulation including the film-forming agent prepared so as to be spread to the skin, and also includes solvent in which the film-forming agent is dissolved and other additives.

"Transdermal preparation" defines a preparation including the film-forming agent, a solvent to dissolve this, an active ingredient and other additives.

"Polyurethane(A)" defined in the present invention is prepared by polymerization of ingredients (a-1), (a-2) and (a-3), is represented by the following formula 1, and has an average molecular weight of 10,000–500,000:

(a-1) polyethylene glycol;

(a-2) polydiol which has stronger hydrophobicity than the (a-1) polyethylene glycol and contains an hydroxyl group on both ends; and (a-3) diisocyanate having an isocyanate moiety on the both ends.

water-content of the film-forming agent produced from film-forming agent formulation of the present invention. It is preferred that content of polyethylene glycol (a-1) is 10–90% by weight to the total weight of (a-1)+(a-2)+(a-3), and molecular weight is 200–50,000, preferably, 1,000–5,000.

Second, polyol (a-2) is a polymer with stronger hydrophobicity compared to polyethylene glycol, and for example, polyalkylene glycols such as poly(propylene glycol), poly(butylene glycol), poly(tetramethylene glycol), poly(hexamethylene glycol), and a triple block copolymer composed of poly(ethylene glycol) and poly(propylene glycol) [or poly(ethylene glycol)/poly(propylene glycol)/poly(ethylene glycol) or poly(propylene glycol)/poly Chemical formula 1]

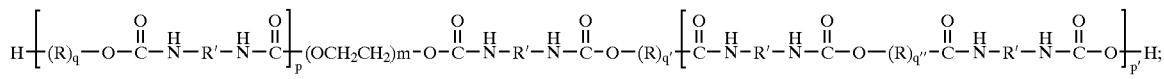

wherein:

m is an integer allowing the weight average molecular weight of $-(OCH_2CH_2)_m$ to be in a range of 200~50,000;

p and p' are the same or different, and are integers to make the weight average molecular weight of polyurethane to be in a range of 10,000~500,000;

q, q' and q" are the same or different, and are integers to make the weight average molecular weight of $(R)q$, $(R)q'$ and $(R)q"$ to be in a range of 200~50,000;

R is substituent of one or two or more selected from the following:

$O(CH_2)_n$; $OCO(CH_2)_n$; $O-CO-(CH_2)_n-CO-O-(CH_2)_n$; $O(CH(CH_3)(CH_2)_n)_{n'}$; $O(C(CH_3)_2(CH_2)_n)_{n'}$, wherein n and n' are the same or different and are integers in a range of 1–10; $OCOCH(CH_3)(CH_2)$; $OSi(CH_3)_2$; and $(OCH_2CH_2)_x-(OCH(CH_3)CH_2)_y-(OCH_2CH_2)_{x'}$, wherein x, x'and y are the same or different and are integers in a range of 1~100; and R' is a substituent of one or a combination of two or more of the following:

$(CH_2)_l$, wherein l is an integer in a range of 1~10;

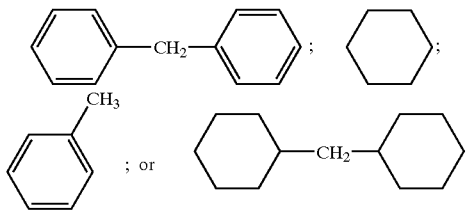

As described above, polyurethane of the present invention covers various kinds of polyurethane synthesized in a way that R or R', different from each other, is introduced to one molecule, that is, in the said formula, R and R' can be at least two different kinds of structure, respectively.

According to one aspect of the present invention, polyurethane (A) is water swelling material (hydrogel) synthesized by using two kinds of polymer (polyol) which have hydroxyl groups on the both ends and differ in hydrophilicity, and as the polyol, (a-1) and (a-2) are used.

First, polyol (a-1) is polyethylene glycol, and endows film-forming agent with hydrophilicity and determines (ethylene glycol)/poly(propylene glycol)] (Brand name Pluronic®); and diols of polyester obtained by ring opening polymerization, i.e., poly(caprolactone diol), poly(lactone diol), poly(glycolic acid diol) etc., may also be used. The second polyol (a-2) is preferred to be contained by 10~90% by weight to total weight of (a-1)+(a-2)+(a-3) and to have molecular weight of 200~50,000, preferably, 1,000~5,000.

As a molecule (a-3) having isocyanate moiety employed for synthesis of polyurethane (A), aromatic diisocyanate such as toluene diisocyanate, 4-chloro-m-phenylene diisocyanate, 4-phenoxy-m-phenylene diisocyanate, 4-methoxy-m-phenylene diisocyanate, 4-butyl-m-phenylene diisocaynate, m-phenylene diisocyanate, p-phenylene diisocyanate, m-xylene diisocyanate, p-xylene diisocyanate, cumene diisocyanate, durene diisocyanate, 1,4-naphthylene diisocyanate, 1,5-naphthylene diisocyanate, 1,8-naphthylene diisocyanate, 2,6-naphthylene diisocyanate, 1,5-tetrahydronaphthylene diisocyanate, p,p'-diphenyl diisocyanate, diphenyl methane-4,4'-diisocyanate, 2,4-diphenyl hexane-1,6-diisocyanate and 3,3'-dimethoxy-4,4'-biphenylene diisocyanate etc., and aliphatic diisocyanate such as methylene diisocyanate, ethylene diisocyanate, trimethylene-Ω,Ω'-diisocyanate, tetramethylene-Ω,Ω'-diisocyanate, pentamethylene-Ω,Ω'-diisocyanate, hexamethylene-Ω,Ω'-diisocyanate, octamethylene-Ω,Ω'-diisocyanate, nonamethylene-Ω,Ω'-diisocyanate, decamethylene-Ω,Ω'-diisocyanate, 2-chloro-trimethylene diisocyanate, 2,3-dimethyltetramethylene diisocyanate, methylenebis(p-cyclohexylisocyanate) etc. can be employed alone or in a combination.

In particular, it is preferred to use alone or in a combination, toluene diisocyanate, diphenyl methane-4,4'-diisocyanate, pentamethylene-Ω,Ω'-diisocyanate, hexamethylene-Ω,Ω'-diisocyanate, octamethylene-Ω,Ω'-diisocyanate, methylenebis (p-cyclohexylisocyanate).

The number of moles of diisocaynate (a-3) employed is equal to the sum of the mole number of polyethylene glycol (a-1) used for the polyurethane synthesis and that of polydiol (a-2), which is more hydrophobic than polyethylene glycol.

The weight average molecular weight of polyurethane (A) prepared according to the method is in a range of 10,000~500,000, and to exhibit desirable elongation, flexibility and tensile strength, range of 30,000~300,000 is preferred.

Polyurethane (A) with desired physical properties can be obtained from respective monomer described above by polymerization method known to persons skilled in the art. For example, the preparation can be carried out according to the method described in Lamba et al., "Polyurethanes in biomedical applications." New York, CRC Press, 1998.

In the present invention, to synthesize polyurethane (A), condensation polymerization was conducted for polyethylene glycol (a-1) and polydiol (a-2), which is more hydrophobic compared to polyethylene glycol and contains hydroxyl group on both ends, in desired ratio, and diisocyanate (a-3) of equal number of moles to the total of the two ((a-1)+(a-2)). The reaction was conducted under heating condition over at least room temperature, preferably, room temperature~80° C., and suitable reaction temperature depends on kind of reactant and amount of catalyst. For activation of the reaction, catalyst, e.g. dibutyltin dilaurate etc. can be used. As reaction solvent, organic solvent such as tetrahydrofuran can be used.

In the film-forming agent of the present invention, polymer (B) having a functional group of carboxylic acid derivative on a main or a side chain is a polymer obtained from addition polymerization of monomer having carboxylic acid derivative, such as carboxylic acid alkyl ester and/or carboxylic acid alkyl amide and/or carboxylic acid alkyl aminoalkyl ester.

The monomer is represented with the following formula, and the polymer (B) includes monomer of the following formula by at least 10 wt %, and weight average molecular weight is preferred to be in a range of 10,000–800,000.

The formula of the monomer is as follows:

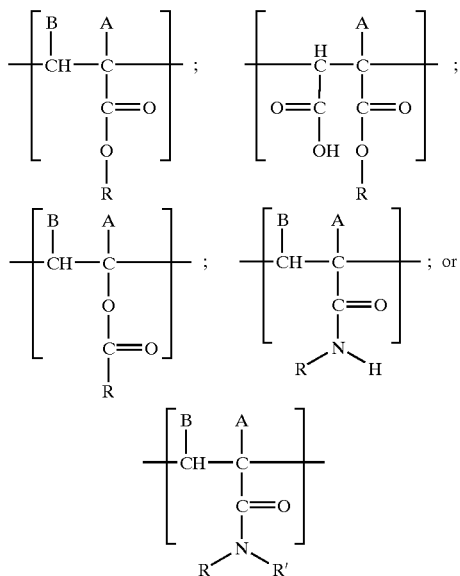

wherein,

A and B are H or $CH_3$;

R and R' are the same or different, and are selected from $CH_3$; $(CH_2)_nCH_3$; $CH(CH_3)_2$; $CH(CH_3)(CH_2)_nCH_3$; $C(CH_3)_3$; $C(CH_3)_2(CH_2)_nCH_3$; $CH_2CH(CH_2CH_3)(CH_2)_nCH_3$; $(CH_2)_nOH$; $CH_2CH(OH)CH_3$; $CH_2CH(OH)(CH_2)_nCH_3$; and $R_1N(R_2)_2$, wherein $R_1$ is $(CH_2)_n$;

$R_2$ is H; $CH_3$; $(CH_2)_nCH_3$; $CH(CH_3)_2$; or $C(CH_3)_3$, wherein n is an integer in a range of 1~15.

As the monomer represented with the formula, that is, a monomer having as functional group carboxylic acid derivative, i.e., carboxylic acid alkyl ester and/or carboxylic acid alkyl amide and/or carboxylic acid alkyl aminoalkyl ester, acrylic acid alkyl ester/amide, methacrylic acid ester/amide, crotonic acid alkyl ester/amide, maleic acid alkyl ester/amide, maleic anhydride etc., can be enumerated.

As specific examples of the acrylic acid alkyl ester monomer, methyl acrylate, ethyl acrylate, butyl acrylate, isobutyl acrylate, isobornyl acrylate, hydroxyethyl acrylate, 2-hydroxy propyl acrylate etc., may be listed.

As specific examples of the acrylic acid amide monomer, acrylamide, N-t-butyl acryl amide, octyl acryl amide can be enumerated.

As specific examples of the methacrylic acid alkyl ester monomer, there are methyl methacrylate, ethyl methacrylate, butyl methacrylate, isobutyl methacrylate, 2-ethylhexyl methacrylate, lauryl methacrylate, hydroxyethyl methacrylate, 2-hydroxypropyl methacrylate, dimethyl aminoethyl methacrylate and t-butyl aminoethyl methacrylate etc.

As specific examples of methacrylic acid amide monomer, methacryl amidopropyl trimethyl ammonium chloride, etc., can be enumerated.

As specific examples of maleic acid alkyl ester monomer, methyl maleate, ethyl maleate, isopropyl maleate and butyl maleate can be enumerated.

As specific examples of crotonic acid alkyl ester monomer, methyl crotonate, ethyl crotonate, isopropyl crotonate, butyl crotonate, etc., can be enumerated.

In the case of the film-forming agent of the present invention, polymer (B) will preferably contain at least 10% by weight of the monomer, because introduction of at least 10% of the monomer by weight allows suitable adhesion power toward skin.

As an example of a polymer obtained from the above-mentioned monomer having functional group raising skin adhesion, the following can be mentioned.

A typical example is the Gantrez® series by ISP company (USA). These include, for example, poly(methyl vinyl ether-co-maleic acid anhydride) (Gantrez® AN); poly(methyl vinyl ether-co-maleic acid ethyl ester) (Gantrez® ES 225); poly(methyl vinyl ether-co-maleic acid isopropyl ester) (Gantrez® ES 335); poly(methyl vinyl ether-co-maleic acid butyl ester) (Gantrez® ES 425), etc.

In addition, the Eudragit® series by Ruhm GmbH (Italy) can be used. These would include, for example, poly(dimethyl aminoethyl methacrylate-co-methacrylic acid alkyl ester) (Eudragit®E); poly(methacrylic acid-co-methacrylic acid alkyl ester) (Eudragit®L/Eudragit®S); and poly(methacrylic acid alkyl ester-co-trimethyl aminoethyl methacrylate)(Eudragit®RL or Eudragit®RS).

Yet other examples include Ultrahold of BASF (Germany), poly(acrylic acid-co-ethyl acrylate-co-N-t-butyl acryl amide); Diahold® EX-55 from Mitsubishi Yuka (Japan), poly(acrylic acid alkyl ester-co-methacrylic acid alkyl ester); Amphomer series from National Starch (USA), copolymer of octyl acryl amide, t-butyl aminoethyl methacrylate and acrylic acid, methacrylic acid or their alkyl ester; Versatile series from National Starch (USA), copolymer of octyl acryl amide and acrylic acid, methacrylic acid or their alkyl ester; Luviset CA 66 from BASF, (Germany), poly(vinyl acetate-co-crotonic acid; and Luviset CAP from BASF, (Germany), poly(vinyl acetate-co-crotonic acid-co-vinyl propionate), etc.

The film-forming agent of the present invention contains 50~99% by weight of polyurethane (A) and 1~50% by weight of addition polymerization polymer (B) having carboxylic acid functional group. Preferably, it contains 70~99% by weight of polyurethane (A) and 1~30% by weight of addition polymerization polymer (B).

The film-forming agent of the present invention can be used by being dissolved in biocompatible solvent, e.g., a mixture of water and ethanol. In case of using a mixture of water and ethanol as solvent, ethanol is used by 1~90%, preferably, 10~70%. The content of the film-forming agent (A+B) in solvent is desirable to be 0.1~50% and preferably 1~30%. This preference is due to the circumstance that when the content is below 0.1%, a film with a suitable thickness is difficult to form, and when the content is 50% or more, spreading is difficult due to the high viscosity.

Tensile strength, Young's modulus and elongation of the film formed from the film-forming agent of the present invention which was obtained through blending of polyurethane (A) and addition polymerization polymer (B) with carboxylic acid derivative as functional group were measured according to 'Standard test method for measuring tensile force of plastic substance' of ASTM standard test method, and adhesion power was measured by peel adhesion test among PSTC test.

As for the physical properties of the film formed by the film-forming agent of the present invention, at a temperature over 20° C., tensile strength is desirable to be at least 0.5 Mpa, preferably, 1 Mpa or more. Where the tensile strength is lower than 0.5 Mpa, collapse of the film during its removal occurs due to its deficiency in strength, leading to difficulty in the easy and complete removal thereof.

Young's modulus is desirable to be 0.1~80 MPa, preferably 1~50 MPa. Below 0.1 MPa, stickiness might be caused for too weak strength, and when exceeding 80 MPa, movement of the film-formed site is interfered, resulting in inconvenience and reluctance.

On the other hand, elongation % calculated according to the following formula 1 is desirable for body movement, when exceeding 100%.

$$\text{Elongation \%} = \frac{(A - B)}{B} \times 100 \qquad \text{Formula 1}$$

wherein A is the length of the specimen at breakpoint; and B is the length of the original specimen.

Additionally, as for peel adhesion, more than 20 g/in against stainless steel is preferred for adequate adhesion towards the skin.

The transdermal preparation according to another aspect of the present invention contains the polyurethane (A) and addition polymerization polymer (B) with a functional group of carboxylic acid derivative; a solvent that can be applied to skin while dissolving the polyurethane (A) and polymer (B); and an active ingredient.

The choice of active ingredient contained in the transdermal preparation of the present invention is not particularly limited, and can include substantially any drug substance having dermatophysiological activity.

For example, the active ingredient may contain one or a mixture of two or more of the following: non-steroidal antiphlogistic analgesics exhibiting antipyretic, analgesia and antiphlogistic activity, e.g., ketoprofene, indomethacin, ibuprofen, diclofenac, flurbiprofen, ketorolac, piroxicam, mefenamic acid, salicylic acid, etc., and their pharmaceutically available derivatives; steroids, i.e., dexamethasone, hydrocortisone, prednisolone, betamethasone, triamcinolone acetonide, fluocinolone acetonide, etc., and their pharmaceutically available derivatives; β-blocker, i.e., propranolol, atenolol, pindolol. timolol, bupranolol, metoprolol, alprenolol, oxprenolol, etc., and their pharmaceutically available derivatives; anticholonergic agents, i.e., atropine, oxybutynin, clidinium, scopolamine, etc., and their pharmaceutically available derivatives; calcium-blockers, i.e., nifedipine, verapamil, diltiazem, etc., and their pharmaceutically available derivatives; other cardiovascular system drugs, i.e., clonidine, prazosin, nitroglycerine, isosorbide dinitrate, etc., and their pharmaceutically available derivatives; estrogens, i.e., estradiol, ethinyl estradiol, progesterone, etc. and their pharmaceutically available derivatives; androgens, i.e., testosterone, etc., and its pharmaceutically available derivatives; local anesthetics, i.e., lidocaine hydrochloride, procaine, tetracaine, prilocaine, bupivacaine, dibucaine, etc., and their pharmaceutically available derivatives; antihistaminics, i.e., diphenhydramine, diphenhydramine maleate, chlorpheniramine, ketotifen, etc., and their pharmaceutically available derivatives; synthetic narcotics, i.e., buprenorphine, fentanyl, sufentanil, etc., and their pharmaceutically available derivatives; bronchodilators, i.e., salbutamol, terbutaline, etc., and their pharmaceutically available derivatives; antibiotics, i.e., gentamicin, erythromycin, neomycin, fusidic acid, etc., and their pharmaceutically available derivatives; antifungal agents, i.e., econazole, itraconazole, ketoconazole, terbinafine, etc., and their pharmaceutically available derivatives; antiviral agents, i.e., acyclovor, ribavirin, alpha interferon. etc. and their pharmaceutically available derivatives; skeletal muscle relaxanst, i.e., eperisone hydrochloride, tolperison hydrochloride, baclophen, biperiden hydrochloride, tizanidine hydrochloride, etc., and their pharmaceutically available derivatives; keratolytics, i.e., salicylic acid, lactic acid, glycolic acid, etc., and their pharmaceutically available derivatives; benzoyl peroxide used as a pimple treating agent; skin protecting agents, i.e., alatonin, dimethicone, petrolatum, dexpanthenol, zinc oxide, etc., and their pharmaceutically available derivatives; vitamins A, B, C, D and E, and their pharmaceutically available derivatives, such as, tretinoin, isotretinoin, retinol, retinoic acid, ascorbic acid, tocopherol, etc.; nicotine and its pharmaceutically available derivatives used as anti-smoking aids; albutine, kojic acid, hydroquinone, oxybenzone, etc., and their pharmaceutically available derivatives used as skin whitening agens; galenical extract, i.e., centella asiatica; minoxidil used for depilation; and heparin sodium and capsaicin and allantoin.

Again, the drug or drugs chosen as the active ingredient(s) in the present invention are not limited to the drugs enumerated above, but can include other drugs or other useful ingredients exhibiting desirable effects.

For the transdermal preparation of the present invention, the dosage of the drug included in the preparation will be an amount sufficient to accomplish the desired effect. How the dosage is determined is well known in the art, and typically takes into consideration, the weight of the patient, the administration times, and the type of drug being administered. In many cases, however, the amount of the drug will be within 0.01~50% by weight of the total weight of the preparation.

Further, the formulation for percutaneous administration may contain a skin permeation enhancer, which raises the skin permeation of the active ingredient. This component will preferably be within a range of 0.5~30% by weight to the total weight of the preparation. Examples of permeation enhancers include, but are not limited to: higher fatty acids, such as oleic acid; higher alcohols, such as lauryl alcohol; polyol, such as polyethylene glycol, etc.; higher fatty acid esters, such as isopropyl myristate, etc.; fatty acid esters of glycerin such as glycerol monolaurate, etc.; fatty acid ethers of polyethylene glycol, such as polyethylene glycol lauryl ether, etc.; fatty acid esters of polyethylene glycol, such as polyethylene glycol laurate, etc.; fatty acid ethers of propylene glycol, such as propylene glycol lauryl ether, etc.; fatty acid esters of propylene glycol, such as propylene glycol laurate, etc.; fatty acid esters of sorbitan, such as sorbitan monolaurate (Span 20), etc.; fatty acid esters of polyethylene glycol sorbitan, such as polyethylene glycol sorbitan monostearate (Tween 60), etc.; terpenes, such as menthol, menthol derivatives and limonene, for example; sulfoxides, such as dimethyl sulfoxide and dodecyl sulfoxide, for example; pyrrolidones, such as N-methyl-2-pyrrolidone; amides, such as lauryl diethanolamide; ethoxydiglycol; N-hydroxy methylactide; sorbitol; urea; squalene; squalane; olive oil; castor oil and their derivatives.

The preparation of the present invention may also optionally contain moisturizing agents and/or softening agents. Examples would include, but not be limited to: glycerin, polyethylene glycol, propylene glycol, 1,3-butylene glycol, lactic acid, mineral oil, lanoline, wax, glucose derivatives, etc. Typically, such agent(s) would be present in an amount that is approximately 0.1~50% of the total weight of the preparation, and preferably, 1~30%. Below 0.1%, the effect is not sufficient, and over 50%, the preparation tends to be excessively sticky or slippery.

The present invention is now described in detail through the the following examples, which are intended for exemplary purposes only, and the invention is not to be limited thereto.

EXAMPLE 1

Synthesis of Polyurethane (A)

Polyethylene glycol (20 g) of molecular weight 2,000 and having a hydroxyl group on both ends and poly (tetramethylene glycol) (20 g) of molecular weight 2,000 were vacuum dried to remove moisture, and put into 500 ml of tetrahydrofuran (THF) purified under Na to dissolve. The solution formed was slowly added to a mixture of hexamethylene diisocyanate (HDI) 3.3 ml and dibutyltin dilaurate 0.1 ml and reacted for 24 hrs under constant stirring in a teflon stirrer at 60~70° C. The synthetic product was precipitated with excess amount of distilled water, and dried for 2 days in 50° C. vacuum oven.

EXAMPLES 2–6

Synthesis of Polyurethane (A)

A series of polyurethanes were synthesized according to the protocol set forth in Example 1, using the ingredients shown in Table 1, below.

TABLE 1

Composition of polyurethane (A)

| Example | poly(ethylene glycol) | poly(tetramethylene glycol) | Molar ratio |
|---|---|---|---|
| 2 | 2,000 | 2,000 | 1:2 |
| 3 | 3,400 | 2,000 | 1:1 |
| 4 | 3,400 | 2,000 | 1:2 |
| 5 | 4,600 | 2,000 | 1:1 |
| 6 | 4,600 | 2,000 | 1:2 |

EXAMPLE 7

Synthesis of Polyurethane (A)

Polyethylene glycol (35 g) of molecular weight 1,500 having hydroxyl groups on both ends and triple block copolymer of polyethylene glycol and polypropylene glycol (brand name Pluronic®, BASF, 10 g) of molecular weight 1,100 were vacuum dried to remove moisture, and dissolved by being added into 500 ml of THF purified under Na. The solution formed was slowly added to a mixture of HDI 5.2 ml and dibutyltin dilaurate 0.1 ml and reacted for 24 hrs under constant stirring in a teflon stirrer at 60~70° C. The synthetic product was precipitated with excess amount of distilled water, and dried for 2 days in 50° C. vacuum oven.

EXAMPLE 8

Synthesis of Polyurethane (A)

Polyethylene glycol (40 g) of molecular weight 2,000 having hydroxyl groups on both ends and poly (tetramethylene glycol) (10 g) of molecular weight 1,000 were vacuum dried to remove moisture, and dissolved in 500 ml of THF purified under Na. The formed solution was slowly added to a mixture of diphenylmethane-4,4-diisocyanate (MDI) (7.6 g) and dibutyltin dilaurate 0.1 ml and reacted for 24 hrs under constant stirring in a teflon stirrer at 60~70° C. The synthetic product was precipitated with excess amount of distilled water, and dried for 2 days in 50° C. vacuum oven.

EXAMPLE 9

Synthesis of Polyurethane (A)

Polyethylene glycol (20 g) of molecular weight 2,000 having hydroxyl groups on both ends and poly-$\epsilon$-caprolactonediol (20 g) of molecular weight 2,000 were vacuum dried to remove moisture, and dissolved by being added into 500 ml of THF purified under Na. The solution formed was slowly added to a mixture of methylene bis (p-cyclohexyl isocyanate) 5.3 ml and dibutyltin dilaurate 0.1 ml and reacted for 24 hrs under constant stirring in a teflon stirrer at 60~70° C. The synthetic product was precipitated with excess amount of distilled water, and dried for 2 days in 50° C. vacuum oven.

EXPERIMENTAL EXAMPLE 1

Determination of the Structure of Polyurethane (A)

To identify the structure of a polyurethane according to the present invention, the NMR spectrum was taken. Specifically, 1H-NMR spectrum was obtained by 300 MHz Varian Gemini 2000 FT-NMR and $CDCl_3$ was used as solvent.

Figure 3:
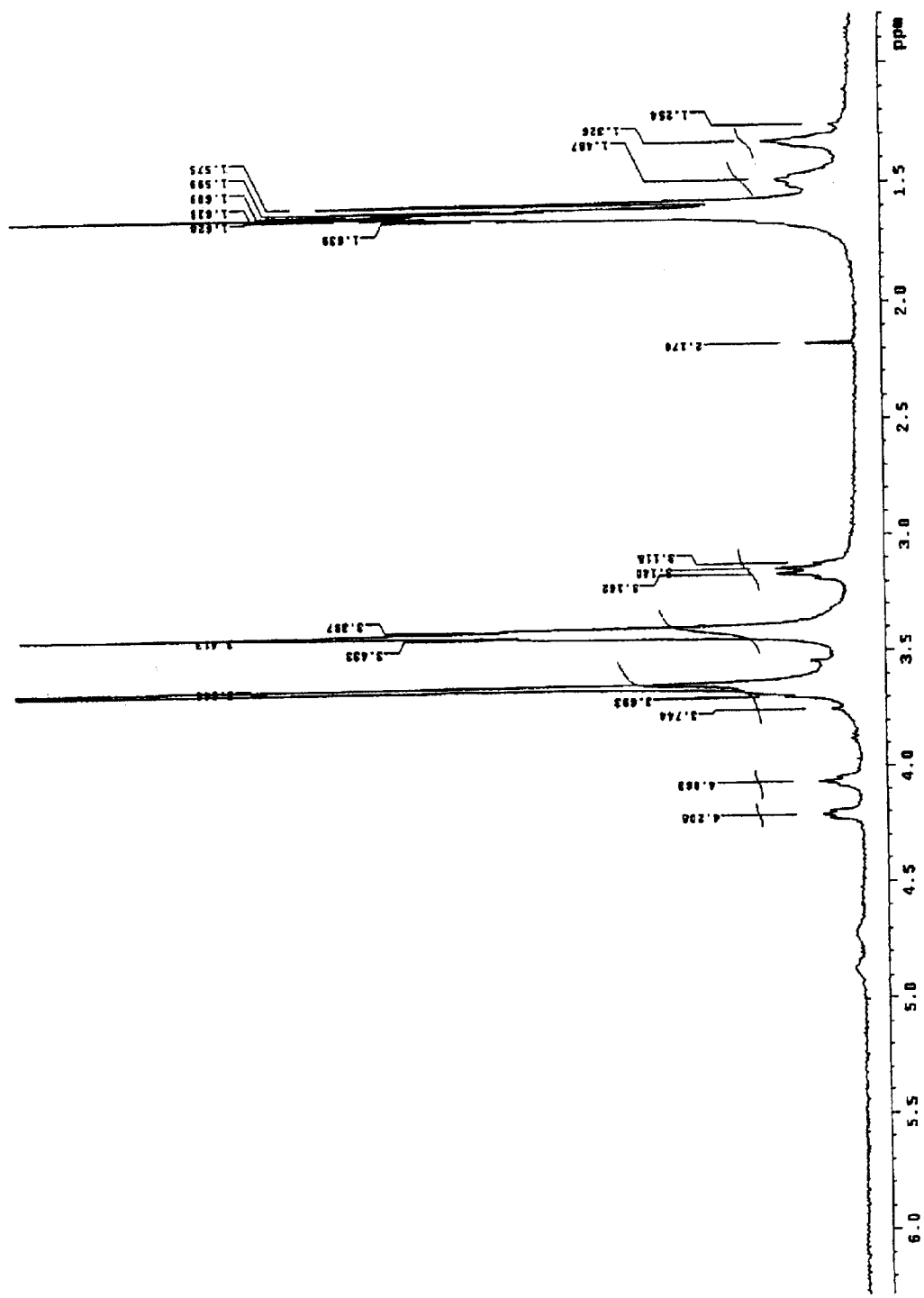
FIG. 3 shows NMR result of polyurethane.

In a typical example of a polyurethane of the present invention, (Examples 1~6, e.g.), that is, a polyurethane obtained by polymerization of polytetramethylene glycol as (a-2), hexamethylene diisocyanate as (a-3) and polyethylene glycol as (a-1), the peak corresponding to —$OCH_2$ $CH_2$— moiety of polyethylene glycol appears at 3.6 ppm (multiplet); the peak corresponding to the —$OCH_2CH_2O$—CONH— group of the terminal region connected to the urethane moiety appears at 4.2 ppm (triplet); the peak corresponding to —$OCH_2(CH_2)_2CH_2$— moiety of polytetramethylene glycol appears at 3.4 ppm (multiplet); the peak corresponding to —$OCH_2(CH_2)_2CH_2$ O—CONH— of the terminal part connected to the urethane appears at 4.1 ppm (triplet); the peak corresponding to —OCNH—CH$_2$(CH$_2$)$_4$CH$_2$—NHCO— moiety of hexamethylene diisocyanate appears at 3.1 ppm (multiplet); and the peaks corresponding to the —OCNH—CH$_2$(CH$_2$)$_4$CH$_2$—NHCO— and —OCH$_2$(CH$_2$)$_2$CH$_2$— moieties of polytetramethylene glycol overlapped at 1.3~1.7 ppm (multiplet). The NMR spectrum is presented in FIG. 3.

EXPERIMENTAL EXAMPLE 2

Determination of the Molecular Weight of Polyurethane

The molecular weight of polyurethane synthesized in Examples 19 was measured. First, the polyurethane synthesized by Examples 1~9 was dissolved in THF to 0.05% concentration, and the molecular weight was then determined by gel permeation liquid chromatography (GPC), according to the following GPC analysis conditions:

Column: A series of continued three columns, Ultrastyragel™ HR1, HR2 and HR4
Mobile phase: THF
Flow rate: 1 ml/min
Detector: Differential Refractometer 410 from Waters
The results are shown in Table 2, below.

TABLE 2

| Example | Molecular weight | Molecular weight distribution (polydispersity) |
|---|---|---|
| 1 | 200,000 | 2.9 |
| 2 | 198,000 | 2.2 |
| 3 | 180,000 | 2.8 |
| 4 | 210,000 | 2.4 |
| 5 | 170,000 | 2.3 |
| 6 | 165,000 | 2.6 |
| 7 | 148,000 | 2.3 |
| 8 | 170,000 | 2.1 |
| 9 | 166,000 | 2.4 |

EXPERIMENTAL EXAMPLE 3

Determination of Tensile Strength, Elongation % and Young's Modulus

Physical properties (tensile strength, elongation % and Young's modulus) of the film-forming agent for drug delivery which was formed by blending of polyurethane (A) and addition polymerization polymer (B) with a functional group of carboxylic acid derivative according to the present invention, was measured.

The measurement was done according to ASTM-D-638M provision among ASTM standard test method by using universal testing machine (HOUNSFIELD H25K-S).

To prepare the specimen for measurement of its physical properties, the film-forming agent of the present invention, i.e., the blended product of polyurethane (A) and addition polymerization polymer (B) with a functional group of carboxylic acid derivative was dissolved in acetone to 7 wt % concentration, dried by being casted over tissue paper to make thickness of 100–200 μm. For comparison, physical properties of the film formed from polyurethane (A) alone was also measured. The kind and composition of (A) and (B) is represented in Table 3.

TABLE 3

Kinds and Composition of Examples 10~20

| | Film forming agent | | Ratio | |
|---|---|---|---|---|
| | | Addition polymerized | | |
| Example | Polyurethane (A) | Polymer (B) | (A) | (B) |
| 10 | Example 1 | poly(methyl vinyl ether-co-maleic acid ethyl ester) (Gantrez ES 225) | 90 | 10 |
| 11 | Example 1 | poly(methyl vinyl ether-co-maleic acid ethyl ester) (Gantrez ES 225) | 80 | 20 |
| 12 | Example 1 | poly(methyl vinyl ether-co-maleic acid ethyl ester) (Gantrez ES 225) | 70 | 30 |
| 13 | Example 1 | poly(methyl vinyl ether-co-maleic acid ethyl ester) (Gantrez ES 225) | 50 | 50 |
| 14 | Example 2 | poly(methyl vinyl ether-co-maleic acid isopropyl ester) (Gantrez ES 335) | 80 | 20 |
| 15 | Example 8 | poly(methyl vinyl ether-co-maleic acid butyl ester) (Gantrez ES 425) | 80 | 20 |
| 16 | Example 3 | poly(dimethyl aminoethyl methacrylate-co-methacrylic acid alkyl ester) (Eudragit E) | 80 | 20 |
| 17 | Example 9 | poly(methacrylic acid-co-methacrylic acid methyl ester) (Eudragit S) | 70 | 30 |
| 18 | Example 4 | poly(acrylic acid-co-ethyl acrylate-co-N-t-butyl acrylamide) (Ultrahold) | 80 | 20 |
| 19 | Example 5 | poly(vinyl acetate-co-crotonic acid) (Luviset CA 66) | 80 | 20 |
| 20 | Example 6 | poly(acrylic acid alkyl ester-co-methacrylic acid alkyl ester) (Diahold EX-55) | 80 | 20 |

Phase separation phenomenon was observed in none of the film-forming agent produced with film-forming solution and specimen prepared in the Examples 10~20.

In addition, for comparison, physical properties of the film obtained from blending of polyurethane (A) and polymer (C) other than the polymer (B) of the present invention was measured by identical method. In particular, the polymer (C) other than the polymer (B) of the present invention is one which has other kind of functional group on a main or a side chain and is known to exhibit adhesion power to skin. The kind and composition of these comparative examples are represented in Table 4.

TABLE 4

Kinds and Composition of Comparative Examples 1~5

| Comparative Example | Film-forming agent | | Ratio | | Phase Separation |
|---|---|---|---|---|---|
| | Polyurethane (A) | Polymer (C) | (A) | (B) | |
| 1 | Example 1 | poly(acrylic acid) (Carbopol 934P, BF Goodrich) | 80 | 20 | Yes (partial gelation) |
| 2 | Example 1 | poly(vinyl pyrrolidone), (PVP K30, ISP) | 80 | 20 | Yes (milky) |
| 3 | Example 1 | poly(ethylene glycol-b-propylene glycol) (Pluronic F127, BASF) | 80 | 20 | No |
| 4 | Example 1 | poly(vinyl alcohol) (PVP 217, Wako) | 80 | 20 | Yes (milky) |
| 5 | Example 1 | hydroxypropyl methylcellulose (Metocell K4M, Dow Chemical) | 80 | 20 | Yes (partial gelation) |

The films obtained by the Examples and Comparative Examples were cut identically with Type M-III specimen according to ASTM-D-638M provision, and tensile strength, elongation % and Young's modulus were measured with universal testing machine while pulling at a speed of 20 mm/min. The results are shown in Table 5, below.

TABLE 5

| | Young's Modulus (MPa) | Tensile Strength at Breakpoint (MPa) | Elongation (%) |
|---|---|---|---|
| Example 1 | 41 | 35 | 3,800 |
| Example 2 | 45 | 43 | 3,800 |
| Example 3 | 39 | 36 | 3,500 |
| Example 4 | 52 | 46 | 4,000 |
| Example 5 | 50 | 41 | 3,800 |
| Example 6 | 58 | 52 | 4,200 |
| Example 7 | 20 | 16 | 2,500 |
| Example 8 | 61 | 55 | 4,600 |
| Example 9 | 42 | 39 | 3,600 |
| Example 10 | 41 | 35 | 3,200 |
| Example 11 | 43 | 36 | 2,800 |
| Example 12 | 53 | 49 | 1,900 |
| Example 13 | 60 | 52 | 1,000 |
| Example 14 | 52 | 43 | 2,600 |
| Example 15 | 70 | 62 | 3,000 |
| Example 16 | 42 | 39 | 3,000 |
| Example 17 | 50 | 42 | 2,900 |
| Example 18 | 62 | 52 | 3,100 |
| Example 19 | 59 | 51 | 2,800 |
| Example 20 | 72 | 62 | 2,500 |
| Comparative Example 1 | 250 | 28 | 60 |
| Comparative Example 2 | 350 | 35 | 120 |
| Comparative Example 3 | 12 | 1 | 20 |
| Comparative Example 4 | 480 | 39 | 90 |

By the above results, it may be confirmed by measurement of modulus and elongation that the film-forming agent of Examples 10~20 of the present invention did not show a phase separation phenomenon while maintaining the unique elasticity and flexibility of polyurethane (Examples 1~9).

On the other hand, the measurement of modulus and elongation confirmed that the Comparative Examples showed phase separation and/or reduction of elasticity and flexibility.

EXPERIMENTAL EXAMPLE 4

Peel Adhesion Test

Testing was conducted to evaluate the adhesion of the film-forming agent for drug delivery according to the present invention. The measurement of adhesion was performed by universal testing machine (INSTRON, Autograph DSC-500, Shimadzu) in accordance with PSTC test method. To prepare the specimen, the polymer of the polyurethane Example and the film-forming agent Example were dissolved in 70% ethanol solution to 10% by weight, and cast on stainless steel, allowing for a thickness of 2 mm and a width of 1 inch after drying. The adhesion of adhered film was measured with universal testing machine while detaching at 20 mm/min speed. The results are shown in Table 6.

TABLE 6

| | Adhesion (g/in.) |
|---|---|
| Polyurethane of Example 1 | 15 |
| Polyurethane of Example 2 | 18 |
| Polyurethane of Example 3 | 17 |
| Polyurethane of Example 4 | 10 |
| Polyurethane of Example 5 | 15 |
| Polyurethane of Example 6 | 13 |
| Polyurethane of Example 8 | 12 |
| Polyurethane of Example 9 | 15 |
| Film-forming agent of Example 10 | 600 |
| Film-forming agent of Example 11 | 1,400 |
| Film-forming agent of Example 12 | 1,100 |
| Film-forming agent of Example 13 | 200 |
| Film-forming agent of Example 14 | 1,500 |
| Film-forming agent of Example 15 | 1,300 |
| Film-forming agent of Example 16 | 920 |
| Film-forming agent of Example 17 | 900 |
| Film-forming agent of Example 18 | 1,000 |
| Film-forming agent of Example 19 | 950 |
| Film-forming agent of Example 20 | 1,000 |

Table 6 reveals that the film-forming agent of the present invention has superior adhesion. In particular, it can be seen that adhesion which was insufficient by polyurethane alone increased 100~1000 times due to the addition of polymer (B) having a functional group of carboxylic acid derivative. In addition, the most superior adhesion was demonstrated with the ratio of polyurethane and polymer (B) at 80:20.

EXPERIMENTAL EXAMPLE 5

Test for Confirming Skin Adhesion Duration of Film-Forming Agent

Testing was carried out to investigate adhesion duration at a curved portion of the body of film-forming agent for drug delivery of the present invention. For this adhesion duration test, the film-forming agent of Example 11 was used, and for comparison, polyurethane Example 1 and poly(vinyl alcohol) were used. Polyurethane of Example 1, film-forming agent in Example 11, poly(vinyl alcohol)(PVA 217, Wako) were added to 65% ethanol to make 10 wt % solution, respectively, for application to skin. The film-forming agent prepared, 0.3 g, was evenly spread on the wrist joint area of 16 cm$^2$, respectively, and dried to form film. Bending and straightening of the film-formed region was repeated at speed of 60 times/min, and the amount of time until detachment of film and change in appearance was measured. The results are shown in Table 7.

TABLE 7

| Time | Film-forming agent of Example 11 | Polyurethane of Example 1 | Poly(vinyl alcohol) |
|---|---|---|---|
| ~3 min | | | coming off was observed following skin texture and outer region area of more than 50% of the formed film was exfoliated |
| ~15 min | | | |
| ~30 min | | coming off of outer region was observed | complete detachment |
| ~1 hr | coming off following skin texture, but no exfoliation | Area of more than 50% of the film formed was exfoliated | |

EXPERIMENTAL EXAMPLE 6

Skin Irritation Test

The film-forming agents of Examples 10, 16, 18 and 19 were dissolved in 65% ethanol to 10 wt %, respectively, and a sample was prepared for skin irritation test. To evaluate skin irritation of the film-forming agent of the present invention, the following test was conducted.

Each film-forming agent, 100 mg, was evenly spread on the forearm in 10 healthy male adults, which site was marked by 9 cm$^2$ size in advance. After solvent is dried after 30 min, the spread film-forming agent layer was protected with contact cloth. After 24 hr, the spread film-forming agent was removed and primary irritation degree at the spread region was determined by the following determination criteria, and reaction degree was calculated with the following formula 2.

| | Determination criteria | |
|---|---|---|
| Grade | Criteria | |
| 0 | no visible reactions | |
| 1 | mild erythema | |
| 2 | intense erythema | |
| 3 | intense erythema with edema | |
| 4 | intense erythema with edema & vesicle | |

$$\text{Reaction Degree (\%)} = \frac{\sum(\text{Grade} \times \text{No. of Response})}{4(\text{Maximum grade}) \times \text{No. of Total Subjects}} \times 100 \quad \text{Formula 2}$$

As the result, the reaction degree of the film-forming agent of Examples 10, 16, 18 and 19 were 1.5, 1.9, 1.5 and 1.4%, respectively, and revealed to cause almost no skin irritation.

As was confirmed from the above test results, the film-forming agent of the present invention not only forms flexible and smooth film suitable for body movement but also is continuously adhered to the lesion, thus the transdermal preparation containing the film-forming agent and active ingredient can accomplish effective delivery of the active ingredient.

The film-forming agent of the present invention can be applied, along with active ingredient, to transdermal preparation for treating local skin disorder, and can be prepared as follows.

EXAMPLE 21

Film-forming agent for skin application comprising the following ingredient and composition ratio was obtained by method as described below.

| Ingredient | % (w/w) |
|---|---|
| (A): polyurethane in Example 1 | 9 |
| (B): poly(methyl vinyl ether-co-maleic acid ethyl ester) (Gantrez ES 225) | 1 |
| ketoprofen | 3 |
| ethoxydiglycol | 1 |
| menthol | 2 |
| glycerin | 2 |
| polyethylene glycol 400 | 3 |
| 65% ethanol solution | to 100 |

In 40 parts of ethanol solution, (A) and (B) were dissolved by stirring to obtain film-forming agent solution. On the other hand, to 20 parts of ethanol solution, ketoprofen, ethoxydiglycol, menthol, glycerin and polyethylene glycol 400 were added and dissolved by stirring. This solution was slowly added to aqueous solution containing the film-forming agent under stirring, and the remaining ethanol was added and stirred until homogeneity.

EXAMPLE 22

Film-forming agent for skin application comprising the following ingredient and ratio was obtained by method as described below.

| Ingredient | % (w/w) |
|---|---|
| (A): polyurethane in Example 1 | 8 |
| (B): poly(methyl vinyl ether-co-maleic acid ethyl ester) (Gantrez ES 225) | 4 |
| diclofenac diethylammonium | 1 |
| polyoxyethylene sorbitan monooleate (Tween 80) | 3 |
| dimethyl sulfoxide | 5 |
| glycerin | 2 |

-continued

| Ingredient | % (w/w) |
|---|---|
| polyethylene glycol 400 | 5 |
| 70% ethanol solution | to 100 |

In 40 parts of ethanol solution, (A) and (B) were dissolved by stirring to obtain film-forming agent solution. On the other hand, to 20 parts of ethanol solution, diclofenac diethylammonium, Tween 80, dimethyl sulfoxide, glycerin and polyethylene glycol 400 were added and dissolved by stirring. This solution was slowly added to aqueous solution containing the film-forming agent under stirring, and the remaining ethanol was added and stirred until homogeneity.

EXAMPLE 23

Film-forming agent for skin application comprising the following ingredient and ratio was obtained by method as described below.

| Ingredient | % (w/w) |
|---|---|
| (A): polyurethane in Example 2 | 7 |
| (B): poly(methyl vinyl ether-co-maleic acid isopropyl ester) (Gantrez ES 335) | 3 |
| piroxicam | 0.5 |
| polyethylene glycol(2)laurylether | 2 |
| dimethyl sulfoxide | 5 |
| glycerin | 2 |
| propylene glycol | 3 |
| polyethylene glycol 400 | 5 |
| 90% ethanol solution | to 100 |

(A) and (B) were dissolved in 40 parts of ethanol solution by stirring to obtain film-forming agent solution. On the other hand, to 20 parts of ethanol solution, piroxicam, polyethylene glycol(2) lauryl ether, dimethyl sulfoxide, glycerin, propylene glycol and polyethylene glycol 400 were added and dissolved by stirring. This solution was slowly added to aqueous solution containing the film-forming agent under stirring, and the remaining ethanol was added and stirred until homogeneity.

EXAMPLE 24

Film-forming agent for skin application comprising the following ingredient and ratio was obtained by method as described below.

| Ingredient | % (w/w) |
|---|---|
| (A): polyurethane in Example 3 | 7 |
| (B): poly(methyl vinyl ether-co-maleic acid butyl ester) (Gantrez ES 425) | 7 |
| flurbiprofen | 4 |
| capsaicin | 0.025 |
| methyl laurate | 2 |
| d,l-camphor | 5 |
| glycerin | 2 |
| menthol | 3 |
| polyethylene glycol 400 | 5 |
| 80% ethanol solution | to 100 |

(A) and (B) were dissolved in 40 parts of ethanol solution by stirring to obtain film-forming agent solution. On the other hand, to 20 parts of ethanol solution, flurbiprofen, capsaicin, methyl laurate, d,l-camphor, glycerin, menthol and polyethylene glycol 400 were added and dissolved by stirring. This solution was slowly added to aqueous solution containing the film-forming agent under stirring, and the remaining ethanol was added and stirred until homogeneity.

EXAMPLE 25

Film-forming agent for skin application comprising the following ingredient and composition ratio was obtained by method described below.

| Ingredient | % (w/w) |
|---|---|
| (A): polyurethane in Example 3 | 8 |
| (B): poly(dimethyl aminoethyl methacrylate-co-methacrylic acid ester) (Eudragit E) | 5 |
| ketorolac tromethamine | 5 |
| glycerol monolaurate | 2 |
| ceraphil-31 | 5 |
| glycerin | 2 |
| menthol | 3 |
| polyethylene glycol 400 | 5 |
| 50% ethanol solution | to 100 |

In 40 parts of ethanol solution, (A) and (B) were dissolved by stirring to obtain film-forming agent solution. On the other hand, to 20 parts of ethanol solution, ketorolac tromethamine, glycerol monolaurate, ceraphil-3 1, glycerin, menthol and polyethylene glycol 400 were added and dissolved by stirring. This solution was slowly added to aqueous solution containing the film-forming agent under stirring, and the remaining ethanol was added and stirred until homogeneity.

EXAMPLE 26

Film-forming agent for skin application comprising the following ingredient and composition ratio was obtained by method described below.

| Ingredient | % (w/w) |
|---|---|
| (A): polyurethane in Example 9 | 8 |
| (B): poly(methacrylic acid-co-methacrylic acid methyl ester) (Eudragit S) | 2 |
| sodium fusidate | 2 |
| polyethylene glycol laurate | 1 |
| olive oil | 1 |
| glycerin | 2 |
| polyethylene glycol 400 | 3 |
| 30% ethanol solution | to 100 |

(A) and (B) were dissolved in 40 parts of ethanol solution by stirring to obtain film-forming agent solution. On the other hand, to 20 parts of ethanol solution, sodium fusidate, polyethylene glycol laurate, olive oil, glycerin and polyethylene glycol 400 were added and dissolved by stirring. This solution was slowly added to aqueous solution containing the film-forming agent under stirring, and the remaining ethanol was added and stirred until homogeneity.

EXAMPLE 27

Film-forming agent for skin application comprising the following ingredient and composition ratio was obtained by method described below.

| Ingredient | % (w/w) |
|---|---|
| (A): polyurethane in Example 1 | 6 |
| (B): poly(dimethyl aminoethyl methacrylate-co-methacrylic acid) (Eudragit E) | 4 |
| dipropionic acid betamethasone | 0.064 |
| clotrimazole | 1 |
| gentamycin sulfate | 0.1 |
| N-methyl-2-pyrrolidone | 1 |
| glycerin | 2 |
| polyethylene glycol 400 | 3 |
| 50% ethanol solution | to 100 |

In 40 parts of ethanol solution, (A) and (B) were dissolved by stirring to obtain film-forming agent solution. On the other hand, to 20 parts of ethanol solution, dipropionic acid betamethasone, clotrimazole, gentamicin sulfate, N-methyl-2-pyrrolidone, glycerin and polyethylene glycol 400 were added and dissolved by stirring. This solution was slowly added to aqueous solution containing the film-forming agent under stirring, and the remaining ethanol was added and stirred until homogeneity.

EXAMPLE 28

Film-forming agent for skin application comprising the following ingredient and composition ratio was obtained by method described below.

| Ingredient | % (w/w) |
|---|---|
| (A): polyurethane in Example 4 | 8 |
| (B): poly(acrylic acid-co-ethyl acrylate-co-N-t-butyl acrylamide) (Ultrahold) | 5 |
| prednisolone | 0.5 |
| diphenhydramine hydrochloride | 0.1 |
| neomycin sulfate | 0.5 |
| isopropyl myristate | 2 |
| glycerin | 3 |
| polyethylene glycol 400 | 3 |
| 60% ethanol solution | to 100 |

In 40 parts of ethanol solution, (A) and (B) were dissolved by stirring to obtain film-forming agent solution. On the other hand, to 20 parts of ethanol solution, prednisolone, diphenhydramine hydrochloride, neomycin sulfate, isopropyl myristate, glycerin and polyethylene glycol 400 were added and dissolved by stirring. This solution was slowly added to aqueous solution containing the film-forming agent under stirring, and the remaining ethanol was added and stirred until homogeneity.

EXAMPLE 29

Film-forming agent for skin application comprising the following ingredient and composition ratio was obtained by method described below.

| Ingredient | % (w/w) |
|---|---|
| (A): polyurethane in Example 4 | 10 |
| (B): poly(vinyl acetate-co-crotonic acid) (Luviset CA 66) | 3 |
| heparin sodium | 0.4 |
| dexpanthenol | 2.5 |
| dimethyl sulfoxide | 15 |
| Glycerin | 3 |
| Propylene glycol | 2 |
| 85% ethanol solution | to 100 |

In 40 parts of ethanol solution, (A) and (B) were dissolved by stirring to obtain film-forming agent solution. On the other hand, to 20 parts of ethanol solution, heparin sodium, dexpanthenol, dimethyl sulfoxide, glycerin and propylene glycol were added and dissolved by stirring. This solution was slowly added to aqueous solution containing the film-forming agent under stirring, and the remaining ethanol was added and stirred until homogeneity.

EXAMPLE 30

Film-forming agent for skin application comprising the following ingredient and composition ratio was obtained by method described below.

| Ingredient | % (w/w) |
|---|---|
| (A): polyurethane in Example 5 | 6 |
| (B): poly(acrylic acid alkyl ester-co-methacrylic acid alkyl ester) (Diahold EX-55) | 5 |
| Ketoconazole | 2 |
| sorbitol monolaurate (Span 20) | 1 |
| Glycerin | 3 |
| polyethylene glycol 400 | 2 |
| 70% ethanol solution | to 100 |

In 40 parts of ethanol solution, (A) and (B) were dissolved by stirring to obtain film-forming agent solution. On the other hand, to 20 parts of ethanol solution, ketoconazole, sorbitol monolaurate, glycerin and polyethylene glycol 400 were added and dissolved by stirring. This solution was slowly added to aqueous solution containing the film-forming agent under stirring, and the remaining ethanol was added and stirred until homogeneity.

EXAMPLE 31

Film-forming agent for skin application comprising the following ingredient and ratio was obtained by method described below.

| Ingredient | % (w/w) |
|---|---|
| (A): polyurethane in Example 6 | 5 |
| (B): poly(methyl vinyl ether-co-maleic acid ethyl ester) (Gantrez ES 225) | 5 |
| Acyclovir | 5 |
| polyethylene glycol 600 | 5 |
| Glycerin | 3 |
| propylene glycol | 2 |
| 40% ethanol solution | to 100 |

In 40 parts of ethanol solution, (A) and (B) were dissolved by stirring to obtain film-forming agent solution. On the other hand, to 20 parts of ethanol solution, acyclovir, polyethylene glycol 600, glycerin and propylene glycol were added and dissolved by stirring. This solution was slowly added to aqueous solution containing the film-forming agent under stirring, and the remaining ethanol was added and stirred until homogeneity.

EXAMPLE 32

Film-forming agent for skin application comprising the following ingredient and ratio was obtained by method described below.

| Ingredient | % (w/w) |
| --- | --- |
| (A): polyurethane in Example 7 | 20 |
| (B): poly(methacrylic acid alkyl ester-co-trimethyl aminoethyl methacrylate) (Eudragit RL) | 10 |
| Tretinoin | 0.025 |
| glycerol monooleate | 1 |
| glycerin | 3 |
| propylene glycol | 2 |
| 55% ethanol solution | to 100 |

In 40 parts of ethanol solution, (A) and (B) were dissolved by stirring to obtain film-f0.orming agent solution. On the other hand, to 20 parts of ethanol solution, tretinoin, glycerol monooleate, glycerin and propylene glycol were added and dissolved by stirring. This solution was slowly added to aqueous solution containing the film-forming agent under stirring, and the remaining ethanol was added and stirred until homogeneity.

EXAMPLE 33

Film-forming agent for skin application comprising the following ingredient and composition ratio was obtained by method described below.

| Ingredient | % (w/w) |
| --- | --- |
| (A): polyurethane in Example 8 | 7 |
| (B): poly(octyl acrylamide-co-acrylic acid-co-methacrylic acid alkyl ester) (Versatyl) | 5 |
| benzoyl peroxide | 10 |
| sorbitan monooleate (Span 80) | 1 |
| Sorbitol | 2 |
| menthol | 1 |
| glycerin | 3 |
| propylene glycol | 2 |
| 40% ethanol solution | to 100 |

In 40 parts of ethanol solution, (A) and (B) were dissolved by stirring to obtain film-forming agent solution. On the other hand, to 20 parts of ethanol solution, benzoyl peroxide, sorbitan monooleate, sorbitol, menthol, glycerin and propylene glycol were added and dissolved by stirring. This solution was slowly added to aqueous solution containing the film-forming agent under stirring, and the remaining ethanol was added and stirred until homogeneity.

EXAMPLE 34

Film-forming agent for skin application comprising the following ingredient and composition ratio was obtained by method described below.

| Ingredient | % (w/w) |
| --- | --- |
| (A): polyurethane in Example 9 | 10 |
| (B): poly(acrylic acid-co-ethyl acrylate-co-N-t-butyl acrylamide) (Ultrahold) | 5 |
| kojic acid | 1 |
| ethoxydiglycol | 3 |
| sorbitol | 2 |
| glycerin | 3 |
| vitamin E | 2 |
| propylene glycol | 2 |
| 90% ethanol solution | to 100 |

In 40 parts of ethanol solution, (A) and (B) were dissolved by stirring to obtain film-forming agent solution. On the other hand, to 20 parts of ethanol solution, kojic acid, ethoxydiglycol, sorbitol, glycerin, and propylene glycol were added and dissolved by stirring. This solution was slowly added to aqueous solution containing the film-forming agent under stirring, and the remaining ethanol was added and stirred until homogeneity.

EXAMPLE 35

Film-forming agent for skin application comprising the following ingredient and composition ratio was obtained by method described below.

| Ingredient | % (w/w) |
| --- | --- |
| (A): polyurethane in Example 5 | 25 |
| (B): poly(vinyl acetate-co-crotonic acid) (Luviset CA 66) | 5 |
| eperisone hydrochloride | 10 |
| lauryl diethanolamine | 1 |
| limonene | 3 |
| glycerin | 3 |
| propylene glycol | 2 |
| 50% ethanol solution | To 100 |

In 40 parts of ethanol solution, (A) and (B) were dissolved by stirring to obtain film-forming agent solution. On the other hand, to 20 parts of ethanol solution, eperisone hydrochloride, lauryl diethanolamine, limonene, glycerin and propylene glycol were added and dissolved by stirring. This solution was slowly added to aqueous solution containing the film-forming agent under stirring, and the remaining ethanol was added and stirred until homogeneity.

EXAMPLE 36

Film-forming agent for skin application comprising the following ingredient and composition ratio was obtained by method described below.

| Ingredient | % (w/w) |
| --- | --- |
| (A): polyurethane in Example 9 | 8 |
| (B): poly(acrylic acid alkyl ester-co-methacrylic acid alkyl ester) (Diahold EX-55) | 6 |
| salicylic acid | 16.7 |
| lactic acid | 16.7 |
| Urea | 3 |
| vitamin E | 2 |
| glycerin | 2 |
| 1,3-butanediol | 2 |
| polyethylene glycol 400 | 5 |
| 40% ethanol solution | to 100 |

In 40 parts of ethanol solution, (A) and (B) were dissolved by stirring to obtain film-forming agent solution. On the other hand, to 20 parts of ethanol solution, salicylic acid, lactic acid, urea, vitamin E, glycerin, 1,3-butanediol and polyethylene glycol 400 were added and dissolved by stirring. This solution was slowly added to aqueous solution containing the film-forming agent under stirring, and the remaining ethanol was added and stirred until homogeneity.

EXAMPLE 37

Film-forming agent for skin application comprising the following ingredient and composition ratio was obtained by method described below.

| Ingredient | % (w/w) |
|---|---|
| (A): polyurethane in Example 1 | 10 |
| (B): poly(acrylic acid alkyl ester-co-methacrylic acid alkyl ester) (Diahold EX-55) | 6 |
| minoxidil | 3 |
| dexpanthenol | 1.5 |
| polyethylene glycol(10) monolaurate | 3 |
| glycerin | 5 |
| polyethylene glycol 400 | 8 |
| 40% ethanol solution | to 100 |

In 40 parts of ethanol solution, (A) and (B) were dissolved by stirring to obtain film-forming agent solution. On the other hand, to 20 parts of ethanol solution, minoxidil, dexpanthenol, polyethylene glycol(10) monolaurate, glycerin and polyethylene glycol 400 were added and dissolved by stirring. This solution was slowly added to aqueous solution containing the film-forming agent under stirring, and the remaining ethanol was added and stirred until homogeneity.

COMPARATIVE EXAMPLE 6

Film-forming agent for skin application comprising the following ingredient and composition ratio was obtained by method described below.

| Ingredient | % (w/w) |
|---|---|
| (A): polyurethane in Example 1 | 10 |
| ketoprofen | 3 |
| ethoxydiglycol | 1 |
| menthol | 2 |
| glycerin | 2 |
| polyethylene glycol 400 | 3 |
| 65% ethanol solution | To 100 |

In 40 parts of ethanol solution, (A) was dissolved by stirring to obtain film-forming agent solution. On the other hand, to 20 parts of ethanol solution, ketoprofen, ethoxydiglycol, menthol, glycerin and polyethylene glycol were added and dissolved by stirring. This solution was slowly added to aqueous solution containing the film-forming agent under stirring, and the remaining ethanol was added and stirred until homogeneity.

COMPARATIVE EXAMPLE 7

Film-forming agent for skin application comprising the following ingredient and composition ratio was obtained by method described below.

| Ingredient | % (w/w) |
|---|---|
| Poly(vinyl alcohol) | 10 |
| ketoprofen | 3 |
| ethoxydiglycol | 1 |
| menthol | 2 |
| glycerin | 2 |
| polyethylene glycol 400 | 3 |
| 65% ethanol solution | to 100 |

In 40 parts of ethanol solution, poly(vinyl alcohol) was dissolved by stirring to obtain film-forming agent solution. On the other hand, to 20 parts of ethanol solution, ketoprofen, ethoxydiglycol, menthol, glycerin, polyethylene glycol 400 were added and dissolved by stirring. This solution was slowly added to aqueous solution containing the film-forming agent under stirring, and the remaining ethanol was added and stirred until homogeneity.

COMPARATIVE EXAMPLE 8

Film-forming agent for skin application comprising the following ingredient and composition ratio was obtained by method described below.

| Ingredient | % (w/w) |
|---|---|
| (A) polyurethane in Example 1 | 12 |
| diclorofenac diethylammonium | 1 |
| polyoxyethylene sorbitan monooleate (Tween 80) | 3 |
| dimethyl sulfoxide | 5 |
| glycerin | 2 |
| polyethylene glycol 400 | 5 |
| 70% ethanol solution | to 100 |

In 40 parts of ethanol solution, (A) was dissolved by stirring to obtain film-forming agent solution. On the other hand, to 20 parts of ethanol solution, diclorofenac diethylammonium, polyoxyethylene sorbitan monooleate (Tween 80), dimethyl sulfoxide, glycerin and polyethylene glycol 400 were added and dissolved by stirring. This solution was slowly added to aqueous solution containing the film-forming agent under stirring, and the remaining ethanol was added and stirred until homogeneity.

COMPARATIVE EXAMPLE 9

Film-forming agent for skin application comprising the following ingredient and composition ratio was obtained by method described below.

| Ingredient | % (w/w) |
|---|---|
| poly(vinyl alcohol) | 12 |
| diclorofenac diethylammonium | 1 |
| polyoxyethylene sorbitan monooleate (Tween 80) | 3 |
| dimethyl sulfoxide | 5 |
| glycerin | 2 |
| polyethylene glycol 400 | 5 |
| 70% ethanol solution | to 100 |

In 40 parts of ethanol solution, poly(vinyl alcohol) was dissolved by stirring to obtain film-forming agent solution. On the other hand, to 20 parts of ethanol solution, diclorofenac diethylammonium, Tween 80, dimethyl sulfoxide, glycerin and polyethylene glycol 400 were added and dissolved by stirring. This solution was slowly added to aqueous solution containing the film-forming agent under stirring, and the remaining ethanol was added and stirred until homogeneity.

EXPERIMENTAL EXAMPLE 7

Evaluation of Transdermal Preparation: Skin Permeation Test 1

The transdermal preparation of Example 21 and those of Comparative Examples 6 and 7 were spread, 200 μl, respectively, on incised skin of abdominal region in hair-removed guinea pig. The skin spread was arranged at Franz-type diffusion cell with the part spread facing the upside. The bottom space was filled with phosphate buffer solution (pH 7.4) and the diffusion apparatus was maintained at 37° C. The buffer solution of the receptor was stirred at a constant speed of 300 rpm, and after passage of a certain amount of time, an aliquot of receptor's solution was taken and supplemented with same amount of the buffer solution. The aliquot was subjected to high pressure liquid chromatography (HPLC) analysis to determine the drug concentration.

High Pressure Liquid Chromatography (HPLC) condition is as follows.

Column: YMC-Pack ODS-AM (150×6.0 mm, I.D. 5 μm)
Mobile phase: 70:30(V/V)=methanol:0.1% acetic acid aqueous solution
Flow rate: 1 ml/min
Detector: UV 254 nm
The results are represented in FIG. 1.

Experimental Example 8

Evaluation of Transdermal Preparation: Skin Permeation Test 2

The transdermal preparation of Example 22 and those of Comparative Examples 8 and 9 were spread, 200 μl, respectively, on incised skin of hair-removed abdominal region in healthy guinea pig, and by identical method with Experimental Example 7, drug concentration was determined by HPLC analysis.

High Pressure Liquid Chromatography (HPLC) condition is as follows.

Figure 2:
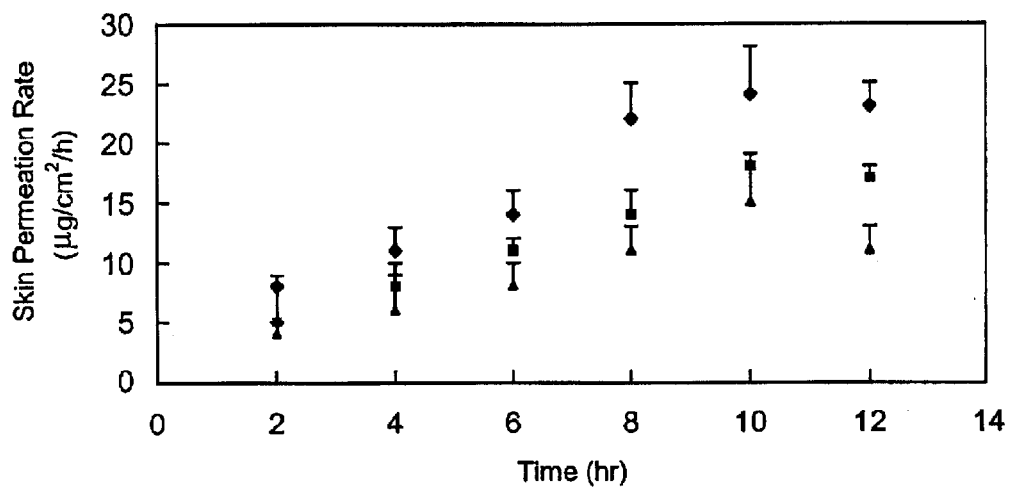
FIG. 2 shows skin permeation rate of diclophenac diethylammonium of Example 22 (♦), Comparative Example 8 (■), and Comparative Example 9 (▲) through the skin of guinea pig.

Column: YMC-Pack ODS-AM (150×6.0 mm, I.D. 5 μm)
Mobile phase: 53:47(V/V)=acetonitrile:0.02 M sodium acetate buffer solution (pH5.8)
Flow rate: 1 ml/min
Detector: UV 280 nm
The results are represented in FIG. 2.

As can be seen from the Experimental Example, the transdermal preparation prepared from the film-forming agent of the present invention not only provides convenience to user for superior elasticity, flexibility and adhesion but also accomplishes effective delivery of active ingredient such as ketoprofen and diclofenac diethylammonium.

In light of the foregoing working examples, it is shown that the film-forming agent comprising thermoplastatic polyurethane and addition polymerization polymer according to the present invention exhibits no phase separation in spite of the difference in structure between polyurethane and the main chain of addition polymerization polymer. Moreover, the film-forming agent of the present invention shows superior elasticity and flexibility. Therefore, it may be understood that the addition polymerization polymer of the present invention does not cause a change in microphase separation structure of polyurethane, leading to maintenance of intact elasticity and flexibility of polyurethane. Further, the film-forming agent so obtained has improved skin adhesion, superior to that of polyurethane alone. Therefore, the present invention provides a film-forming agent for drug delivery and a transdermal preparation containing the same and one or more active ingredients, and which does not exhibit the problems of conventional film-forming transdermal preparation, i.e., interference with body movement due to deficient elasticity and flexibility and collapse and detachment after drying, while at the same time being free of defects of conventional ointment and gel preparations, such as smearing or stickiness. Further, the film-forming agent and transdermal preparation of the present invention have the following characteristics differentiated from the previous external preparation invention.

The film-forming agent of the present invention is easily spread on the skin when dissolved in a biocompatible solvent, it forms a film within a few minutes after being spread, and this film is thin, transparent and leaves no visible mark, thereby enabling repeated spreading on an exposed region. In addition, the formed film does not stain clothes or socks or other body parts that it may come into contact with.

When the transdermal preparation containing the film-forming agent of the present invention is spread on the skin, the formed film has superior adhesion, lasts for a long time and releases active ingredient over a long time, exhibiting superior effects even with fewer applications than with previous formulations.

The film-forming agent of the present invention causes no discomfort due to its excellent elasticity and flexibility when forming a film on any region of body. Also, even where the film is formed at such flexible areas as a joint region, it shows no cracks despite repeated movement.

Further, The film-forming agent of the present invention exhibits superior skin adhesion, and is not forced out or detached from the original application site.

Additionally, one of the ingredients of the film-forming agent of the present invention, polyurethane is a water swelling material (hydrogel) that can contain moisture, retain flexibility via inclusion of moisture, and continuously supplies moisture to the skin, leading to an increased skin permeation level of effective ingredient.

The film formed with the transdermal preparation of the present invention can be easily removed by hand after completion of drug delivery, and the removal becomes easier upon swelling with water.

We claim:
1. A film-forming agent characterized in comprising 50~99% by weight of the following polyurethane (A) and 1~50% by weight of the following addition polymerization polymer (B) having a functional group of carboxylic acid derivative:

(A) Polyurethane with weight average molecular weight of 10,000~500,000, which is prepared by polymerization of the following ingredient (a-1), (a-2), and (a-3), and represented with the following formula 1:
(a-1) polyethylene glycol;
(a-2) polydiol with hydroxyl groups at both ends, which has stronger hydrophobicity than the said (a-1); and (a-3) diisocyanate having isocyanate at both ends

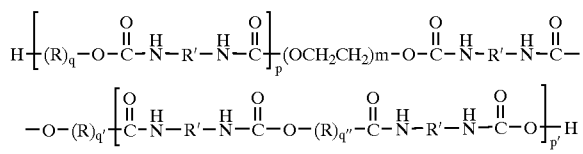

[Formula 1]

and (B) The addition polymerization polymer with a functional group of carboxylic acid derivative has weight average molecular weight of 10,000~800,000 which contains carboxylic acid alkyl ester and/or carboxylic acid alkyl amide and/or carboxylic acid alkyl amino alkyl ester on main chain or side chain.

2. The film-forming agent as set forth in claim 1, characterized in that the said polyurethane (A) and addition polymerization polymer (B) with a functional group of carboxylic acid derivative are dissolved in a solvent applicable to skin.

3. The film-forming agent as set forth in claim 1, characterized in that the said addition polymerization polymer (B) with a functional group of carboxylic acid derivative contains on main chain or side chain carboxylic acid alkyl ester and/or carboxylic acid alkyl amide and/or carboxylic acid alkyl aminoalkyl ester, and as monomers imparting the said functional group, contains more than 10 wt % of one or more selected from the group consisting of acrylic acid alkyl ester/amide, methacrylic acid alkyl ester/amide, crotonic acid alkyl ester/amide, maleic acid alkyl ester/amide, maleic anhydride and vinyl ester.

4. The film-forming agent as set forth in claim 3, characterized in that the said acrylic acid alkyl ester monomer is selected from a group consisting of methyl acrylate, ethyl acrylate, butyl acrylate, isobutyl acrylate, isobornyl acrylate, hydroxyethyl acrylate and 2-hydroxypropyl acrylate; acrylic acid amide monomer is selected from a group consisting of acryl amide, N-t-butylacryl amide and octyl acryl amide; methacrylic acid alkyl ester monomer is selected from a group consisting of methyl methacrylate, ethyl methacrylate, butyl methacrylate, isobutyl methacrylate, 2-ethylhexyl methacrylate, lauryl methacrylate, hydroxyethyl methacrylate, 2-hydroxypropyl methacrylate, dimethyl aminoethyl methacrylate and t-butyl aminoethyl methacrylate; methacrylic acid amide monomer is methacryl amidopropyl/trimethyl ammonium chloride; maleic aicd alkyl ester is selected from a group consisting of methyl maleate, ethyl maleate, isopropyl maleate and butyl maleate; crotonic aicd alkyl ester monomer is selected from a group consisting of methyl crotonate, ethyl crotonate, isopropyl crotonate and butyl crotonate; and vinyl ester monomer is selected from a group consisting of vinyl acetate, vinyl propionate and vinyl neodecanoate.

5. The film-forming agent as set forth in claim 1, characterized in that the said polymer with a functional group of carboxylic acid derivative at main or side chain is selected from a group consisting of poly(methyl vinyl ether-co-maleic anhydride), poly(methyl vinyl ether-co-maleic acid ethyl ester), poly(methyl vinyl ether-co-maleic acid isopropyl ester), poly(methyl vinyl ether-co-maleic acid butyl ester), poly(dimethyl aminoethyl methacrylate-co-methacrylic acid alkyl ester), poly(methacrylic acid-co-methacrylic acid alkyl ester), poly(methacrylic acid alkyl ester-co-trimethyl aminoethyl methacrylate), poly(acrylic acid-co-ethyl acrylate-co-N-t-butyl acrylamide), poly (acrylic acid alkyl ester-co-methacrylic acid alkyl ester), poly(octyl acrylamide-co-butyl aminoethyl methacrylate-co-acrylic acid), poly(octyl acrylamide-co-butyl aminoethyl methacrylate-co-acrylic acid alkyl ester), poly(octyl acrylamide-co-butyl aminoethyl methacrylate-co-methacrylic acid), poly(octyl acrylamide-co-butyl aminoethyl methacrylate-co-methacrylic acid alkyl ester), poly (octyl acrylamide-co-acrylic acid), poly(octyl acrylamide-co-acrylic acid alkyl ester), poly(octyl acrylamide-co-methacrylic acid), poly(octyl acrylamide-co-methacrylic acid alkyl ester), poly(vinyl acetate-co-crotonic acid), and poly(vinyl acetate-co-crotonic acid-co-vinyl propionate).

6. The film-forming agent as set forth in claim 1, characterized in that weight ratio of the said polyurethane (A) and the addition polymerization polymer (B) with a functional group of carboxylic acid derivative is 50:50~99:1.

7. The film-forming agent as set forth in claim 2, characterized in that the said solvent is an aqueous alcohol solution.

8. The film-forming agent as set forth in claim 2, characterized in that the said polyurethane (A) and the addition polymerization polymer (B) with a functional group of carboxylic acid derivative are dissolved in the said solvent to be in a range of 0.1~50 wt %.

9. The film-forming agent as set forth in claim 1, characterized in that the said (a-2) is one or more selected from polyalkylene glycols and polyesterdiols.

10. The film-forming agent as set forth in claim 9, characterized in that the said polyalkylene glycols are selected from a group consisting of poly(propylene glycol), poly(butylene glycol), poly(tetramethylene glycol), poly (hexamethylene glycol), a triple block copolymer composed of poly(ethylene glycol) and poly(propylene glycol) (or poly(ethylene glycol)/poly(propylene glycol)/poly(ethylene glycol) or poly(propylene glycol)/poly(ethylene glycol)/poly(propylene glycol)); and the said polyesterdiols are selected from a group consisting of polycaprolactonediol, polylactonediol and polyglycolic acid diol.

11. The film-forming agent as set forth in claim 1, characterized in that the said (a-3) is one or more selected from aromatic diisocyanate and aliphatic diisocyanate.

12. The film-forming agent as set forth in claim 1, characterized in that the said film-forming agent, when forming the film upon spread to the skin, allows tensile strength of the film to be at least 0.5 Mpa, elongation % to be at least 100%, and adhesion determined by peel adhesion test of PSTC testing method to be at least 20 g/in to stainless steel.

13. A transdermal preparation, characterized by comprising the film-forming agent of claim 1; a biocompatible solvent that can dissolve the said film-forming agent; and active ingredient that can be delivered through skin.

14. The transdermal preparation as set forth in claim 13, characterized in that the said film-forming agent is 0.1~50 wt % to the said solvent, and the said active ingredient is 0.01~50 wt % to the total weight of the preparation.

15. The transdermal preparation as set forth in claim 13, characterized in that the said active ingredient applicable to skin is one or a mixture of two or more selected from a group consisting of non-steroidal antiphlogistic analgesic; steroid; local anesthetic; antihistaminic; antibiotic; antifungal agent; antiviral agent; skeletal muscle relaxant; keratolytic; pimple treating agent; skin protecting agent; vitamins A, B, C, D, E and their pharmaceutically available derivatives; skin whitening agent; galenical extract; heparin sodium; and capsaicin.

16. The transdermal preparation as set forth in claim 15, characterized in that the said active ingredient is one or a mixture of two or more selected from a group consisting of ketoprofen, diclofenac diethylammonium, piroxicam, flubiprofen, ketorolac tromethamine, sodium fusidate, capsaicin, dipropionic acid betamethasone, clotrimazole, gentamicin sulfate, prednisolone, diphenhydramine hydrochloride, erythromycin, neomycin sulfate, heparin sodium, dexpanthenol, ketoconazole, terbinafine hydrochloride, acyclovir, tretinoin, benzoyl peroxide, kojic acid, eperisone hydrochloride, lidocaine hydrochloride, salicylic acid, lactic acid, urea, vitamin A, vitamin C, vitamin E, minoxidil and allantoin.

17. The transdermal preparation as set forth in claim 13, characterized by containing at least one additive selected from a group consisting of skin permeation enhancer, softening agent, moisturizing agent and hydrophilic polymer to increase viscosity and skin adhesion.

18. The transdermal preparation as set forth in claim 17, characterized in that the said skin permeation enhancer is one or a mixture of two or more selected from a group consisting of higher fatty acid; higher alcohol; polyol; higher fatty acid ester; fatty acid ester of glycerin; fatty acid ether of polyethylene glycol; fatty acid ester of polyethylene glycol; fatty acid ether of propylene glycol; fatty acid ester of propylene glycol; fatty acid ester of sorbitan; fatty acid ester of polyethylene glycol sorbitan; terpenes; sulfoxide; pyrrolidone; amide; ethoxydiglycol, N-hydroxy methyl lactide, sorbitol, urea, squalene, squalane, olive oil, castor oil and its derivatives.

19. The transdermal preparation as set forth in claim 17, characterized in that the said moisturizing agent or softening agent is one or a mixture of two or more selected from glycerin, polyethylene glycol, propylene glycol, 1,3-butanediol, lactic acid, mineral oil, lanolin, wax and glucose derivatives.

* * * * *

UNITED STATES PATENT AND TRADEMARK OFFICE
CERTIFICATE OF CORRECTION

PATENT NO. : 6,750,291 B2
DATED : June 15, 2004
INVENTOR(S) : Kim et al.

It is certified that error appears in the above-identified patent and that said Letters Patent is hereby corrected as shown below:

Column 29,
Lines 48 and 51, delete the word "aicd" and insert -- acid --

Signed and Sealed this

Twenty-first Day of December, 2004

JON W. DUDAS
*Director of the United States Patent and Trademark Office*

UNITED STATES PATENT AND TRADEMARK OFFICE
CERTIFICATE OF CORRECTION

PATENT NO. : 6,750,291 B2
DATED : June 15, 2004
INVENTOR(S) : Kim et al.

It is certified that error appears in the above-identified patent and that said Letters Patent is hereby corrected as shown below:

Column 29,
Line 11, after the Formula 1 structure, insert the following text:

-- [wherein, m is an integer allowing the weight average molecular weight of $(OCH_2CH_2)_m$ to be in a range of 200-50,000;

p and p´ are same or different, and integers to make the weight average molecular weight of polyurethane to be in a range of 10,000~500,000;

q, q´ and q″ are same or different, and integers to make the weight average molecular weight of $(R)_q$, $(R)_{q'}$ and $(R)_{q''}$ to be in a range of 200~50,000;

R is a substituent of one or a combination of two or more selected from the following:

$O(CH_2)_n$; $OCO(CH_2)_n$; $O-CO-(CH_2)_n-CO-O-(CH_2)_{n'}$; $O(CH(CH_3)(CH_2)_n)_{n'}$; $O(C(CH_3)_2(CH_2)_n)_{n'}$ (here n and n´ are same or different, and integers in a range of 1-10.); $OCOCH(CH_3)(CH_2)$; $OSi(CH_3)_2$; and $(OCH_2CH_2)_x$-$(OCH(CH_3)CH_2)_y$-$(OCH_2CH_2)_{x'}$ (here, x, x´ and y are same or different, and integers in a range of 1~100);

UNITED STATES PATENT AND TRADEMARK OFFICE
CERTIFICATE OF CORRECTION

PATENT NO. : 6,750,291 B2
DATED : June 15, 2004
INVENTOR(S) : Kim et al.

It is certified that error appears in the above-identified patent and that said Letters Patent is hereby corrected as shown below:

Column 29 (cont'd),

R˝ is a substituent of one or a combination of two or more selected from the following:

$(CH_2)_l$ (here, $l$ is an integer in a range of 1-10.);

]; and --.

Signed and Sealed this

Fourth Day of October, 2005

JON W. DUDAS
*Director of the United States Patent and Trademark Office*